(12) United States Patent
Kawakami

(10) Patent No.: US 7,762,157 B2
(45) Date of Patent: Jul. 27, 2010

(54) BICYCLE SHIFT OPERATING DEVICE WITH A MULTI-DIRECTION OPERATING MEMBER

(75) Inventor: Tatsuya Kawakami, Sakai (JP)

(73) Assignee: Shimano, Inc., Sakai-ku, Sakai, Osaka (JP)

( * ) Notice: Subject to any disclaimer, the term of this patent is extended or adjusted under 35 U.S.C. 154(b) by 529 days.

(21) Appl. No.: 11/465,617

(22) Filed: Aug. 18, 2006

(65) Prior Publication Data
US 2007/0137384 A1    Jun. 21, 2007

(30) Foreign Application Priority Data
Oct. 6, 2005  (JP)  ............... 2005-293129
Dec. 8, 2005  (JP)  ............... 2005-354857

(51) Int. Cl.
*B62M 25/04*  (2006.01)

(52) U.S. Cl. .................. 74/502.2; 74/489; 74/473.14

(58) Field of Classification Search ............... 74/501.6, 74/502.2, 489, 473.14, 473.15
See application file for complete search history.

(56) References Cited

U.S. PATENT DOCUMENTS

| | | | |
|---|---|---|---|
| 3,972,247 A | 8/1976 | Armstrong | |
| 5,012,692 A | 5/1991 | Nagano | |
| 5,044,213 A | 9/1991 | Nagano | |
| 5,052,241 A * | 10/1991 | Nagano | ................ 74/502.2 |
| 5,078,023 A * | 1/1992 | Scarborough | ............. 74/502.2 |
| 5,203,213 A | 4/1993 | Nagano | |
| 5,222,412 A | 6/1993 | Nagano | |
| 5,241,878 A | 9/1993 | Nagano | |
| 5,257,683 A | 11/1993 | Romano | |
| 5,400,675 A | 3/1995 | Nagano | |
| 5,479,776 A | 1/1996 | Romano | |
| 5,660,083 A | 8/1997 | Huang | |
| 5,676,022 A | 10/1997 | Ose | |

(Continued)

FOREIGN PATENT DOCUMENTS

DE    3136922 A1    3/1983

(Continued)

OTHER PUBLICATIONS

European search report for EP 06010554, the European application that corresponds to this application, dated Nov. 20, 2006.

*Primary Examiner*—Richard W L Ridley
*Assistant Examiner*—Thomas Diaz
(74) *Attorney, Agent, or Firm*—James A. Deland

(57) ABSTRACT

A shift operating device for a bicycle comprises a mounting member structured to be mounted to the bicycle, a cable coupling member coupled to the mounting member for moving a cable in a cable pulling direction and a cable releasing direction, a positioning unit that selectively maintains the cable coupling member in a plurality of operating positions, and an input member that moves in a first direction and in a second direction different from the first direction, and an action member rotatably coupled to the mounting member and separate from the input member. The action member rotates to transmit movement of the first operating member to the positioning unit such that the cable coupling member moves from an origin operating position toward a destination operating position when the first operating member moves in either of both the first direction and the second direction.

35 Claims, 16 Drawing Sheets

U.S. PATENT DOCUMENTS

| | | | |
|---|---|---|---|
| 5,682,794 A * | 11/1997 | Shibata | 74/489 |
| 5,730,030 A | 3/1998 | Masui | |
| 5,806,372 A | 9/1998 | Campagnolo | |
| 5,829,313 A | 11/1998 | Shahana | |
| 5,862,709 A | 1/1999 | Kageyama | |
| 5,896,779 A * | 4/1999 | Biersteker et al. | 74/502.2 |
| 5,921,138 A | 7/1999 | Kojima et al. | |
| 5,957,002 A | 9/1999 | Ueng | |
| 6,006,627 A * | 12/1999 | Ikeda et al. | 74/531 |
| 6,450,060 B1 | 9/2002 | Shahana | |
| 6,502,477 B1 | 1/2003 | Assel | |
| 6,725,740 B2 | 4/2004 | Dal Pra | |
| 2002/0124679 A1 | 9/2002 | Dal Pra | |
| 2002/0139218 A1 * | 10/2002 | Tsumiyama et al. | 74/502.2 |
| 2004/0237697 A1 * | 12/2004 | Kawakami | 74/501.6 |
| 2006/0260428 A1 | 11/2006 | Kawakami et al. | |

FOREIGN PATENT DOCUMENTS

| | | |
|---|---|---|
| DE | 10055403 A1 | 5/2002 |
| EP | 0485955 A1 | 5/1992 |
| EP | 0601211 A1 | 6/1994 |
| EP | 0790176 A1 | 8/1997 |
| EP | 1134158 A2 | 9/2001 |
| EP | 1232940 A2 | 8/2002 |
| EP | 1245483 A2 | 10/2002 |
| JP | 2730555 B2 | 3/1998 |

* cited by examiner

BICYCLE SHIFT OPERATING DEVICE WITH A MULTI-DIRECTION OPERATING MEMBER

BACKGROUND OF THE INVENTION

The present invention is directed to bicycles and, more particularly, to a bicycle shift operating device with a multi-direction operating member.

Most bicycles include a transmission that allows the bicycle to be pedaled at a desired gear ratio. A shift control device mounted to the handlebars and connected to the transmission by a cable often controls the transmission by pulling and releasing the cable. The shift control device typically includes a winding member that pulls (winds) and releases (unwinds) the cable, a winding lever that causes the winding member to pull the control cable, and a release lever that causes the winding member to release the cable. Some shift control devices operate by moving the winding and release levers in the same direction (e.g., Japanese Patent No. 2730555), usually by pushing each lever using the thumb, whereas other shift control devices operate by moving the winding and release levers in opposite directions (e.g., Japanese Patent No. 3065656), usually by pushing the winding lever with the thumb and by pulling the release lever with the index finger. However, some riders may prefer to operate a particular lever in a direction opposite the conventionally designed direction in order to either pull or release the cable.

SUMMARY OF THE INVENTION

The present invention is directed to various features of a bicycle shift control device. In one embodiment, a shift operating device for a bicycle comprises a mounting member structured to be mounted to the bicycle, a cable coupling member coupled to the mounting member for moving a cable in a cable pulling direction and a cable releasing direction, a positioning unit that selectively maintains the cable coupling member in a plurality of operating positions, an input member that moves in a first direction and in a second direction different from the first direction, and an action member rotatably coupled to the mounting member and separate from the input member. The action member rotates to transmit movement of the input member to the positioning unit such that the cable coupling member moves from an origin operating position toward a destination operating position when the input member moves in either of both the first direction and the second direction. Additional inventive features will become apparent from the description below, and such features alone or in combination with the above features may form the basis of further inventions as recited in the claims and their equivalents.

DETAILED DESCRIPTION OF THE EMBODIMENTS

Figure 1:
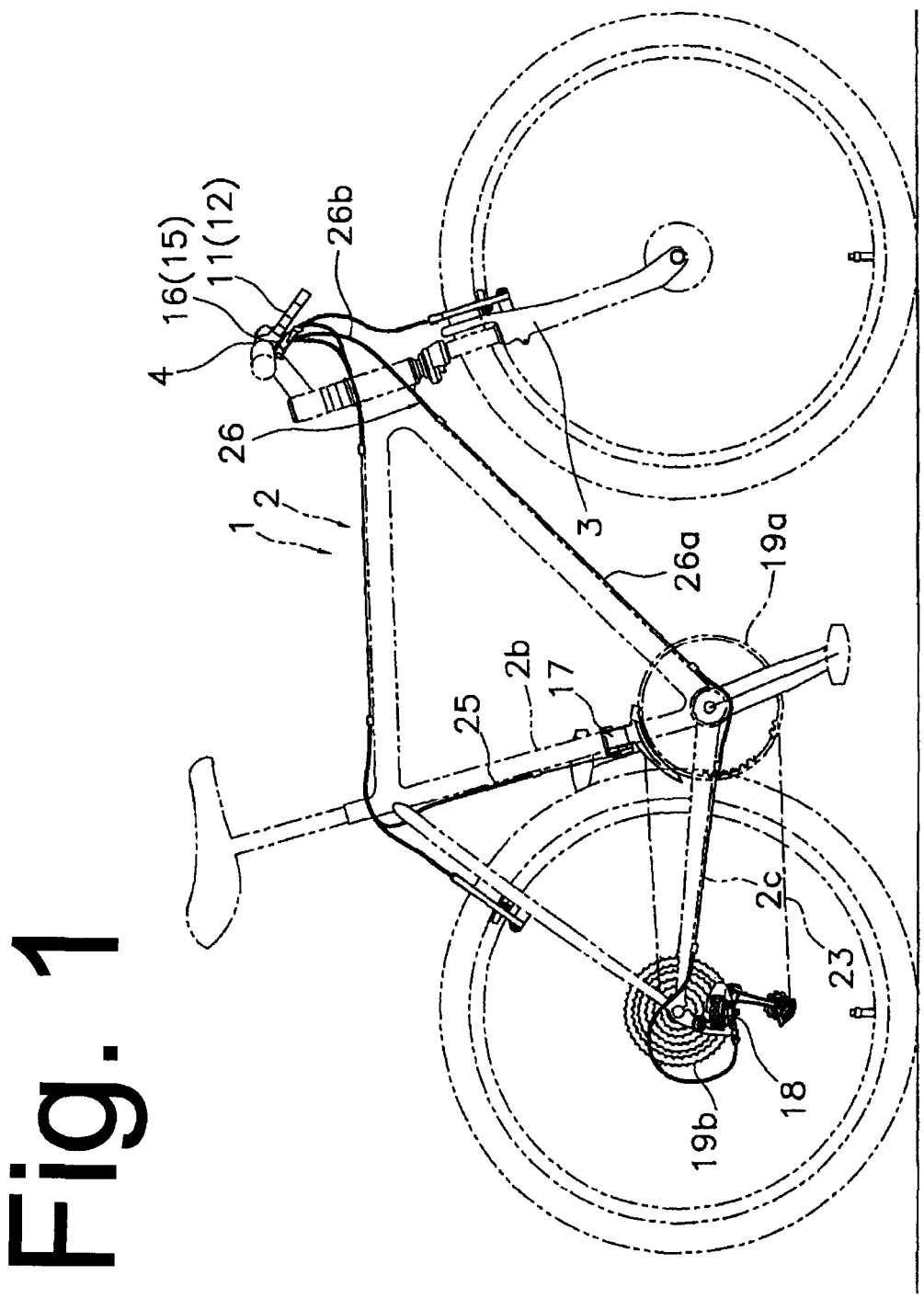
FIG. 1 is a side view of a particular embodiment of a bicycle.

FIG. 1 is a side view of a bicycle 1 that includes particular embodiments of transmission shift control devices. Bicycle 1 is a sport bicycle of a mountain bike type, and it comprises a frame 2, a front suspension fork 3 rotatably mounted to frame 2, a handlebar assembly 4 mounted to the upper part of fork 3, a front derailleur 17 mounted to a middle portion of frame 2, and a rear derailleur 18 is mounted to a rear end of frame 2. Front derailleur 17 is placed, for example, at a lower portion of a seat tube 2b of frame 2 for guiding a chain 23 among a plurality of (e.g., three) front sprockets 19a. Rear derailleur 18 is placed at the rear of a chain stay 2c of frame 2 for guiding chain 23 among a plurality of (e.g., eight) rear sprockets 19b. Front derailleur 17 is connected to a front shift control device 15 through a front shift control cable 25, and rear derailleur 18 is connected to a rear shift control device 16 through a rear shift control cable 26 that includes an inner cable 26a disposed within an outer casing 26b. Front and rear shift control devices 15 and 16 are mounted at opposite ends of handlebar 4 laterally inwardly from front and rear brake levers 12 and 11, respectively, and they are constructed symmetrically while accommodating different numbers of sprockets. Thus, only the structure and operation of rear shift control device 16 will be described in detail.

Figure 2:
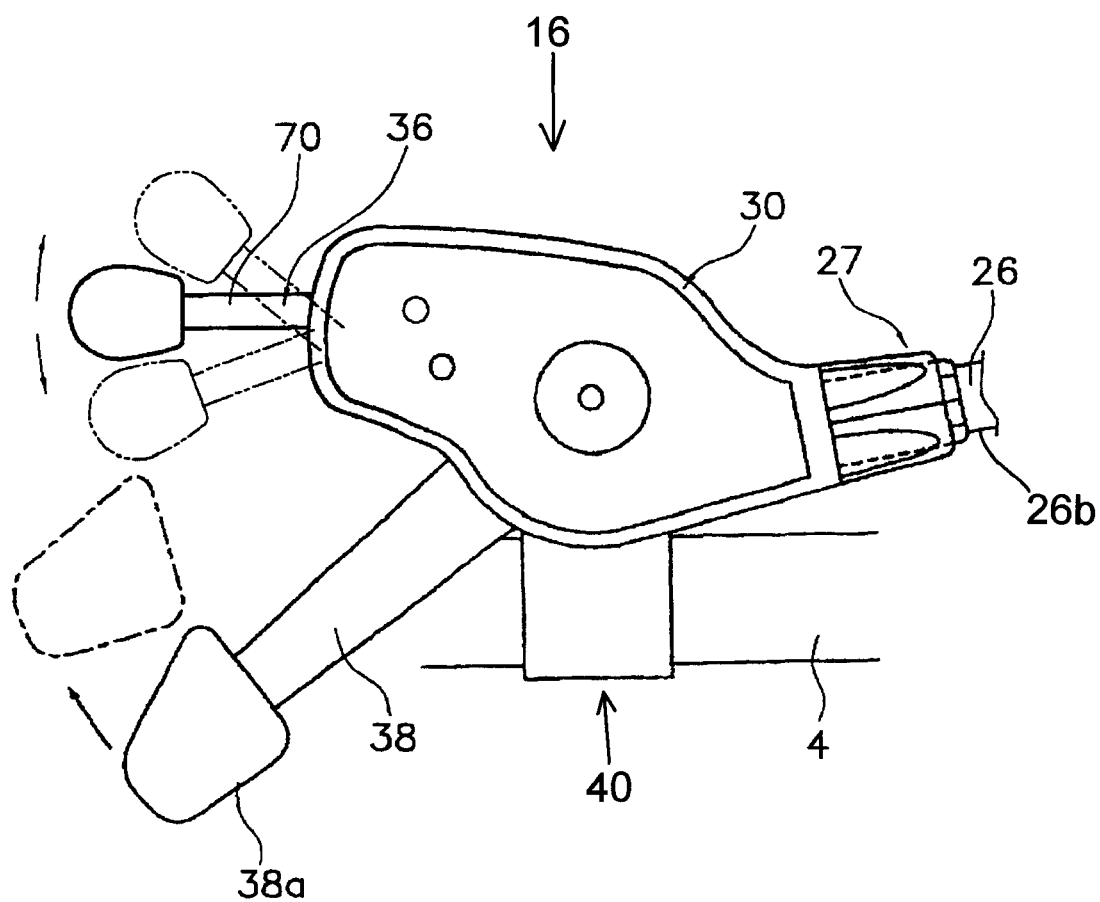
FIG. 2 is a bottom plan view of an embodiment of a shift control device.
Figure 3:
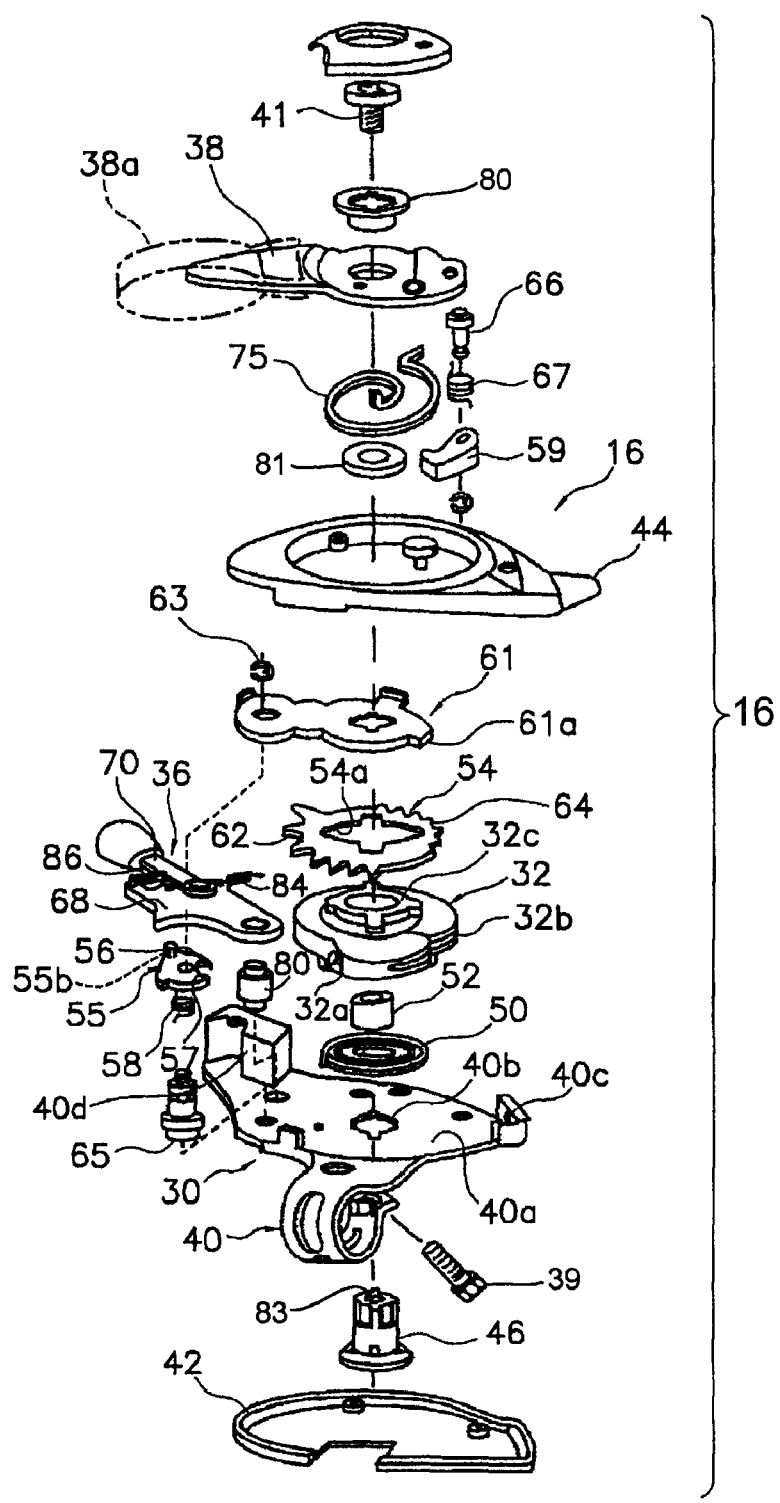
FIG. 3 is an exploded view of the shift control device.
Figure 4:
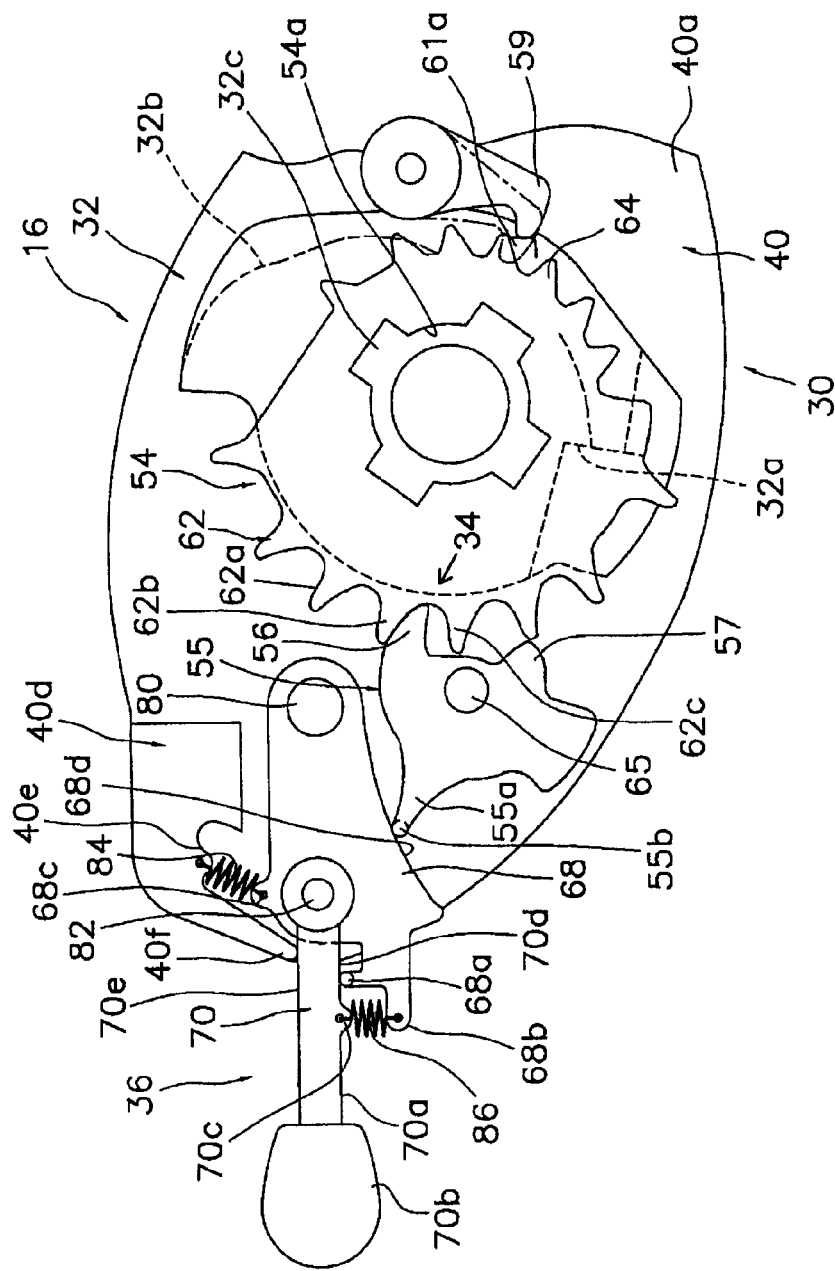
FIG. 4 is an internal plan view of the shift control device with an operating member in a neutral position.

As shown in FIGS. 2 and 3, rear shift control device 16 comprises a mounting member 30 including a bracket 40 that may be formed from a metal plate configured to mount to handlebar 4 by a fastening bolt 39, a release lever 36 for a cable releasing operation, a winding lever 38 for a cable winding operation, a first cover 42 mounted to the lower side of bracket 40, and a second cover 44 mounted to the upper side of bracket 40. Bracket 40 has a planar surface 40a defining an opening 40b through which a support shaft 46 passes. Bracket 40 also has a threaded opening 40c for threadingly receiving an outer casing terminating member 27 (FIG. 2) therein for terminating outer casing 26b of rear shift cable 26. A wall portion 40d is formed at an outer side edge of bracket 40 near release lever 36. As shown in FIG. 4, wall portion 40d includes a spring mounting portion 40e and a control portion 40f that functions in a manner discussed below.

As shown in FIGS. 3 and 4, a winding member 32 is rotatably mounted around support shaft 46 via a bushing 52 between bracket 40 and second cover 44. Winding member 32 rotates in a plane parallel to plane 40a of bracket 40 in cable pulling (winding) and releasing (unwinding) directions. Winding member 32 includes, at an outer peripheral surface thereof, a cable coupling member 32a that locks a cable nipple (not shown) secured to a tip of inner cable 26a in a well-known manner, and a cable winding groove 32b for winding inner cable 26a. A biasing member in the form of a torsion spring 50 biases winding member 32 in a cable releasing direction. Spring 50 has one end fixed to winding member 32 and another end fixed to mounting bracket 40. An engaging protrusion 32c is formed on the upper surface of winding member 32 for engaging a mounting opening 54a in a positioning member 54 so that winding member 32 and positioning member 54 rotate as a unit. In this embodiment, positioning member 54 has a plurality of, e.g., eight radially extending positioning teeth 62 and a plurality of, e.g., eight radially extending drive teeth 64 corresponding to the number of shift positions of rear derailleur 18, and they are spaced accordingly.

A pawl unit 55 including a positioning pawl 56 and a tooth engaging pawl 57 formed together as one piece is pivotably mounted to a pivot shaft 65 that is attached to bracket 40 and to a pawl control plate 61. Pawl control plate 61 is nonrotatably mounted to support shaft 46, and the top of pivot shaft 65 is secured to pawl control plate 61 by a snap ring 63. Positioning pawl 56 rotates in a plane parallel to the rotation plane of winding member 32 between an engaged position shown in FIG. 4 for engaging one of the plurality of positioning teeth 62 (e.g., positioning tooth 62b), thereby preventing rotation of winding member 32 in the cable releasing direction and setting winding member 32 in one of a plurality of operating positions for rear derailleur 18, and a disengaged position shown in FIG. 5 for disengaging from the plurality of positioning teeth 62, thereby allowing rotation of winding member 32. Similarly, tooth engaging pawl 57 rotates in a plane parallel to the rotation plane of winding member 32 between an engaged position shown in FIG. 5 for engaging one of the plurality of positioning teeth 62 (e.g., positioning tooth 62c), thereby preventing unlimited rotation of winding member 32 in the cable unwinding direction after positioning pawl 56 disengages from positioning tooth 62b, and a disengaged position shown in FIG. 4 for disengaging from the plurality of positioning teeth 62, thereby allowing rotation of winding member 32. A biasing member in the form of a torsion spring 58 biases pawl unit 55 so that positioning pawl 56 is urged toward positioning teeth 62 and tooth engaging pawl 57 is urged away from positioning teeth 62. Positioning member 54 and positioning pawl 56 form a positioning unit 34 for maintaining winding member 32 in selected ones of a plurality of operating positions. Since positioning member 54 and positioning pawl 56 are disposed in a common place parallel to winding member 32, shift control device 16 may be compact. A projecting portion 55a of pawl unit 55 extends radially outwardly away from pivot shaft 65. A control member 55b in the form of a pin is mounted to projecting portion 55a and extends generally parallel to pivot shaft 65.

Cable winding lever 38 is mounted to support shaft 46 between a bushing 80 and a washer 81 for rotation between a neutral or start position shown by a solid line in FIG. 2 and an operating or finish position shown by a broken line in FIG. 2. A bolt 41 screws into a threaded opening 83 in the tip of support shaft 46 to hold winding lever 38 in place. A biasing member such as a torsion spring 75 biases winding lever 38 toward the start position. An operating knob 38a is provided at the outer end of winding lever 38.

A drive pawl 59 is rotatably mounted to cable winding lever 38 through a pivot shaft 66 such that drive pawl 59 is located at the opposite end of cable winding lever 38 across from support shaft 46. A biasing member in the form of a torsion spring 67 biases drive pawl 59 toward engagement with the plurality of drive teeth 54. However, pawl control plate 61 has an abutting member 61a to maintain drive pawl 59 in the disengaged position shown by a solid line in FIG. 4 when winding lever 38 is located in the start position. When the rider rotates winding lever 38 from the start position toward the finish position, the tip of drive pawl 59 moves off from abutting member 61a and rotates toward the engaged position.

Release lever 36 comprises an action member 68 and an input member 70. Action member 68 is rotatably mounted around a pivot shaft 80 that is vertically mounted to bracket 40, and input member 70 is rotatably mounted around a pivot shaft 82 that is vertically mounted at an intermediate portion of action member 68. Pivot shaft 82 is spaced apart from pivot shaft 80 and is oriented parallel to pivot shaft 80.

Action member 68 includes a first control portion 68a in the form of a pin, a first spring mounting portion 68b, a second spring mounting portion 68c and a second control portion 68d in the form of an inclined and curved side surface. First control portion 68a is disposed between pivot shaft 82 and first spring mounting portion 68b. Second control portion 68d extends from below pivot shaft 80 arcuately downward to the left to a location below pivot shaft 82, and it engages the side of control member 55b on pawl unit 55.

In this embodiment, input member 70 comprises an arm member 70a and a knob portion 70b, wherein arm member 70a is rotatably mounted to pivot shaft 82, and knob portion 70b is fixed to the free end of arm member 70a. Arm member 70a includes a spring mounting portion 70c disposed opposite spring mounting portion 68b on action member 68, a first control portion 70d in the form of an abutment disposed between pivot shaft 82 and spring mounting portion 70c, and a second control portion 70e in the form of an abutment also disposed between pivot shaft 82 and spring mounting portion 70c, but disposed on the opposite side from first control portion 70d.

A first spring 84 has a first end mounted to first spring mounting portion 68c on action member 68 and a second end mounted to spring mounting portion 40e on wall portion 40d of mounting bracket 40 so that action member 68 is biased clockwise around pivot shaft 80. A second spring 86 has a first end mounted to first spring mounting portion 68b on action member 68 and a second end mounted to spring mounting portion 70c on arm member 70a so that arm member 70a is biased counterclockwise around pivot shaft 82. As a result of these biasing forces, first control portion 70d of arm member 70a is biased to contact first control portion 68a of action member 68, second control portion 70e of arm member 70a is biased to contact control portion 40f of wall portion 40d of mounting bracket 40, and release lever 36 is disposed in the neutral position.

Figure 5:
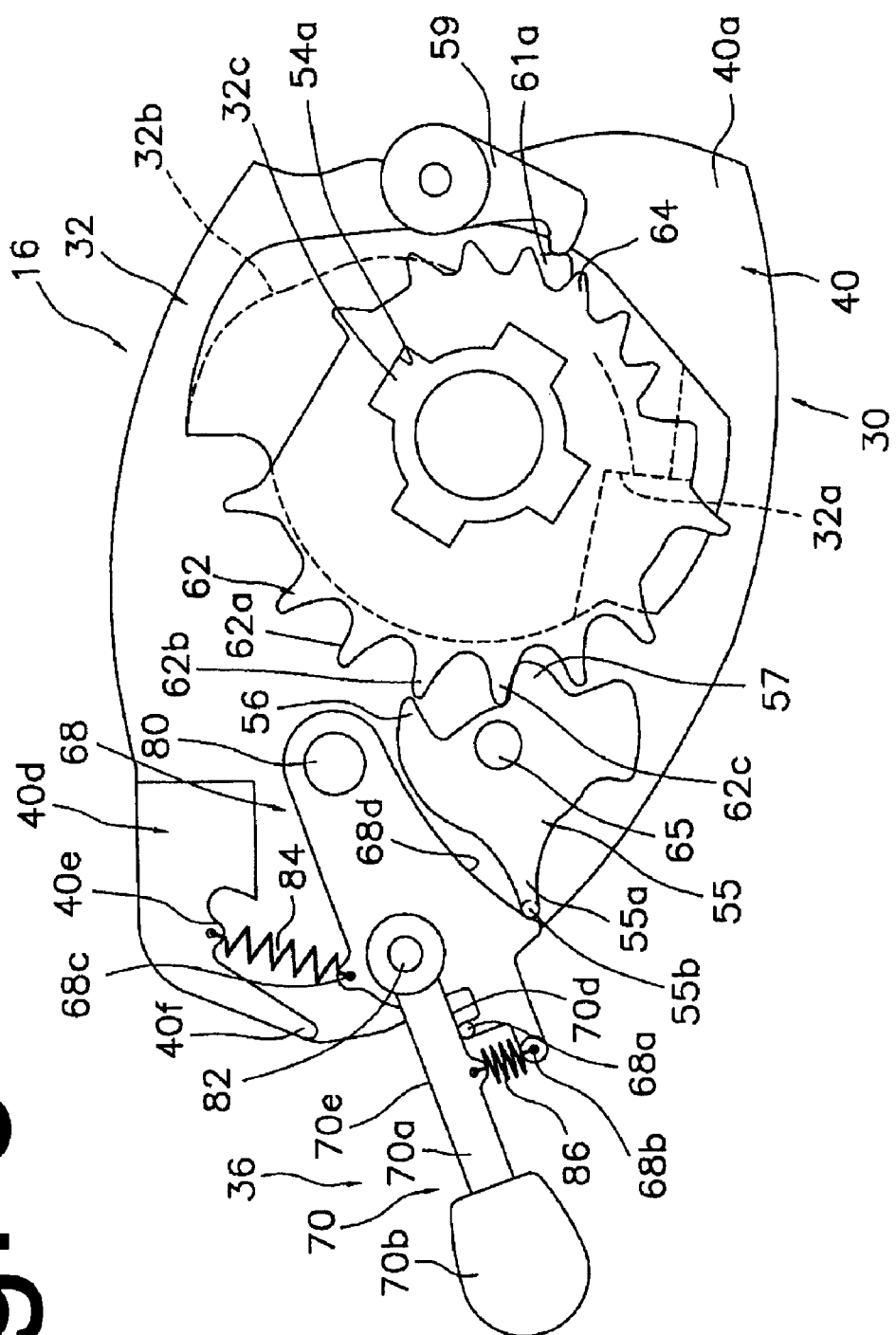
FIG. 5 is an internal plan view of the shift control device when the operating member is moved in a first direction.

To perform a cable release operation, knob portion 70b of input member 70 of release lever 36 is moved in either a first direction (e.g., counterclockwise) or a second direction (e.g., clockwise). When knob portion 70b of release lever 36 is moved in the first direction as shown in FIG. 5, first control portion 70d of arm member 70a contacts first control portion 68a of action member 68 to press action member 68 counterclockwise so that arm member 70a and action member 68 rotate together around a common axis defined by pivot shaft 80. At the same time, second control portion 68d of action member 68 presses against control member 55b of pawl unit 55, and pawl unit 55 rotates counterclockwise to move positioning pawl 56 from the engaged position shown in FIG. 4 to the disengaged position shown in FIG. 5 and to move tooth engaging pawl 57 from the disengaged position to the engaged position. As a result, positioning pawl 56 disengages from positioning tooth 62b, and winding member 32 and positioning member 54 rotate in the cable releasing direction until tooth engaging pawl 57 engages positioning tooth 62c as shown in FIG. 5.

Figure 7:
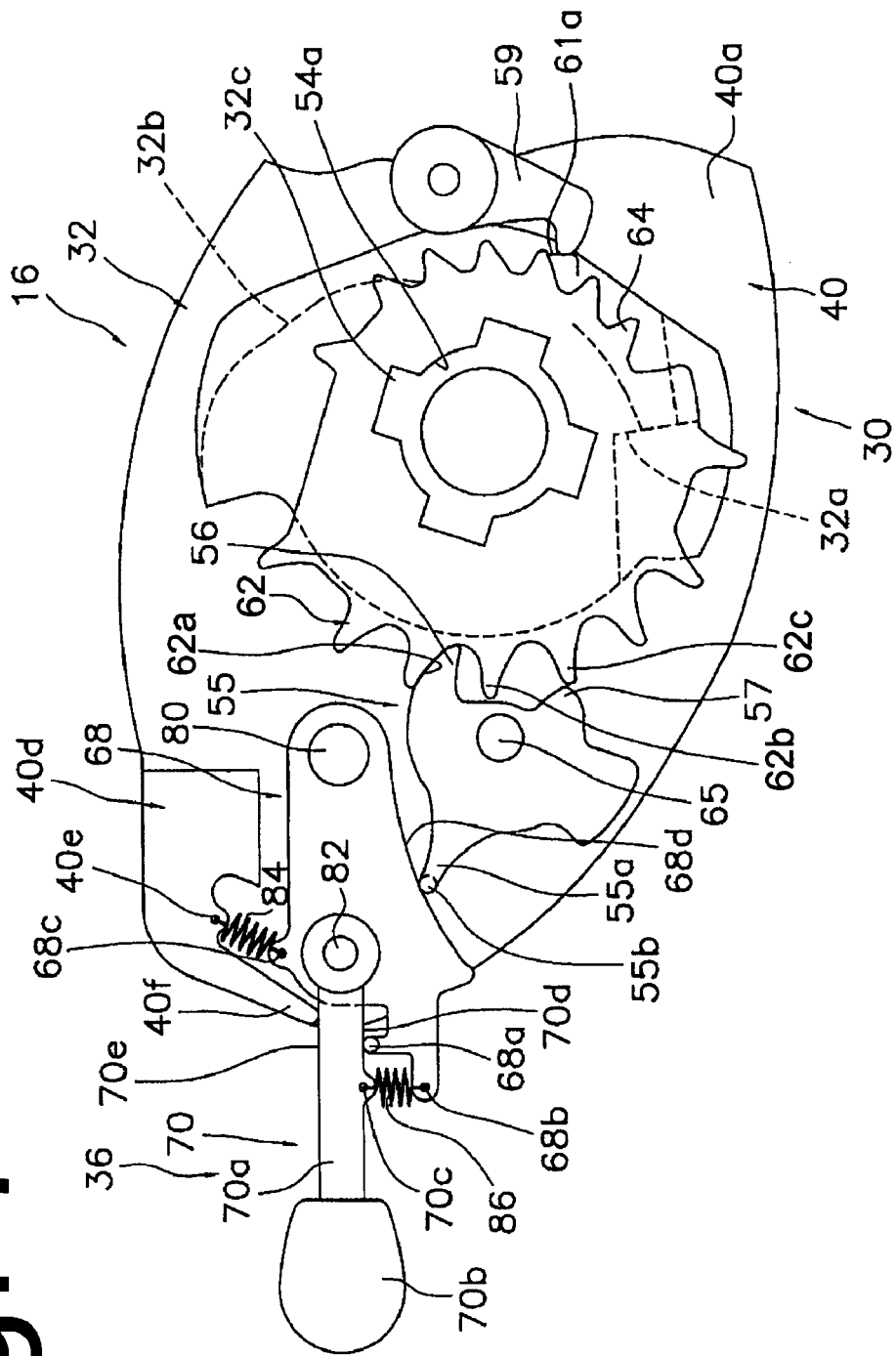
FIG. 7 is an internal plan view of the shift control device after completion of a cable releasing operation.

When the rider releases release lever 36, first spring 84 pulls arm member 70a clockwise until second control portion 70e of arm member 70a contacts control portion 40f of wall portion 40d, second spring 86 pulls action member 68 clockwise so that first control portion 68a of action member 68 continues to contact first control portion 70d of arm member 70a, and release lever 36 is disposed in the neutral position. At the same time, spring 58 rotates pawl unit 55 clockwise so that positioning pawl 56 moves from the disengaged position to the engaged position, and tooth engaging pawl 57 moves from the engaged position to the disengaged position. As a result, tooth engaging pawl 57 disengages from positioning tooth 62c, and winding member 32 and positioning member 54 rotate in the cable releasing direction until positioning pawl 56 engages positioning tooth 62a as shown in FIG. 7, thereby setting winding member 32 in a destination operating position.

Figure 6:
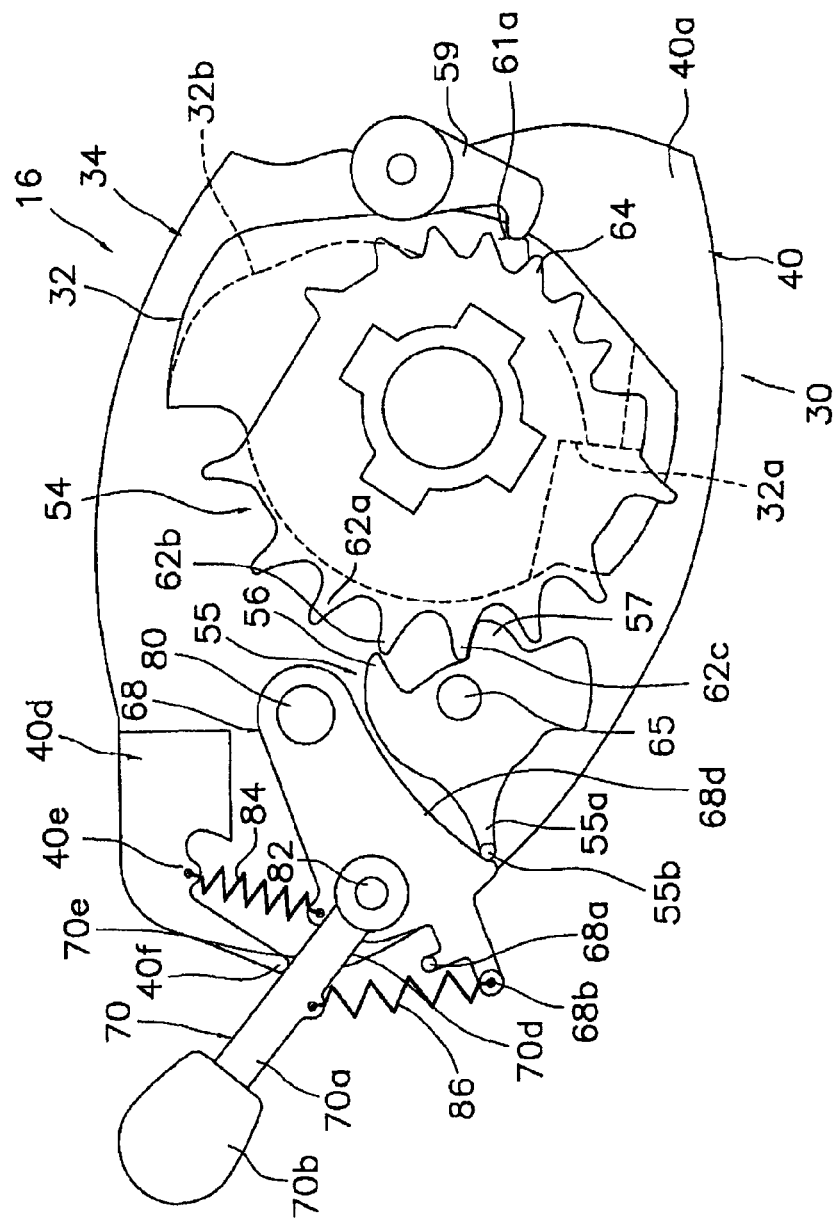
FIG. 6 is an internal plan view of the shift control device when the operating member is moved in a second direction.

When knob portion 70b of release lever 36 is moved in the second direction as shown in FIG. 6, second control portion 70e of arm member 70a contacts control portion 40f of wall portion 40d of mounting bracket 40 so that arm member 70a pivots clockwise around control portion 40f with control portion 40f acting as a fulcrum defining a rotational axis, and the end of arm member 70a connected to pivot shaft 82 rotates around pivot shaft 82 (which defines another rotational axis) while causing action member 68 to rotate counterclockwise around pivot shaft 80. As in the previous operation, second control portion 68d of action member 68 presses against control member 55b on pawl unit 55, and pawl unit 55 rotates counterclockwise to move positioning pawl 56 from the engaged position shown in FIG. 4 to the disengaged position shown in FIG. 6 and to move tooth engaging pawl 57 from the disengaged position to the engaged position. As a result, positioning pawl 56 disengages from positioning tooth 62b, and winding member 32 and positioning member 54 rotate in the cable releasing direction until tooth engaging pawl 57 engages positioning tooth 62c as shown in FIG. 6. Since action member 68 moves in the same direction (e.g., counterclockwise) when release lever 38 moves in either of both the first direction or the second direction, a simple structure can operate shift device 16 when release lever 38 moves in either of both the first direction or the second direction to accommodate rider preference.

When the rider releases release lever 36, first spring 84 pulls action member 68 clockwise which, in turn, causes pivot shaft 82 to pull arm member 70a to rotate counterclockwise until first control portion 68a of action member 68 contacts first control portion 70d of arm member 70a, and release lever 36 is disposed in the neutral position. At the same time, spring 58 rotates pawl unit 55 clockwise so that positioning pawl 56 moves from the disengaged position to the engaged position, and tooth engaging pawl 57 moves from the engaged position to the disengaged position. As a result, tooth engaging pawl 57 disengages from positioning tooth 62c, and winding member 32 and positioning member 54 rotate in the cable releasing direction until positioning pawl 56 engages positioning tooth 62a as shown in FIG. 7, thereby setting winding member 32 in a destination operating position.

When the rider moves winding lever 38 from the start position toward the finish position to accomplish a cable winding operation, the tip of drive pawl 59 moves away from abutting member 61a of pawl control plate 61, and drive pawl 59 is biased by spring 67 to engage one of the drive teeth 64. Continued movement of winding lever 38 causes winding member 32 and positioning member 54 to rotate in the cable pulling direction (clockwise in FIG. 4). During this time, positioning tooth 62c presses against positioning pawl 56 so that pawl unit 55 rotates counterclockwise to the disengaged position. At this time, projecting portion 55a of pawl unit 55 rotates counterclockwise and separates from second control portion 68d of action member 68. However, since action member 68 is biased clockwise by first spring 84, action member 68 and arm member 70a do not move. After positioning tooth 62c passes under positioning pawl 56, pawl unit 55 rotates clockwise so that positioning pawl 56 moves back to the engaged position. If the rider releases winding lever 38 at this time, then winding member 32 and positioning member 54 rotate counterclockwise until positioning pawl 56 engages positioning tooth 62c, and winding member 32 is set at the destination operating position. If the rider continues moving release lever 38, then the process repeats so that winding member 32 moves through a plurality of destination positions.

Figure 8:
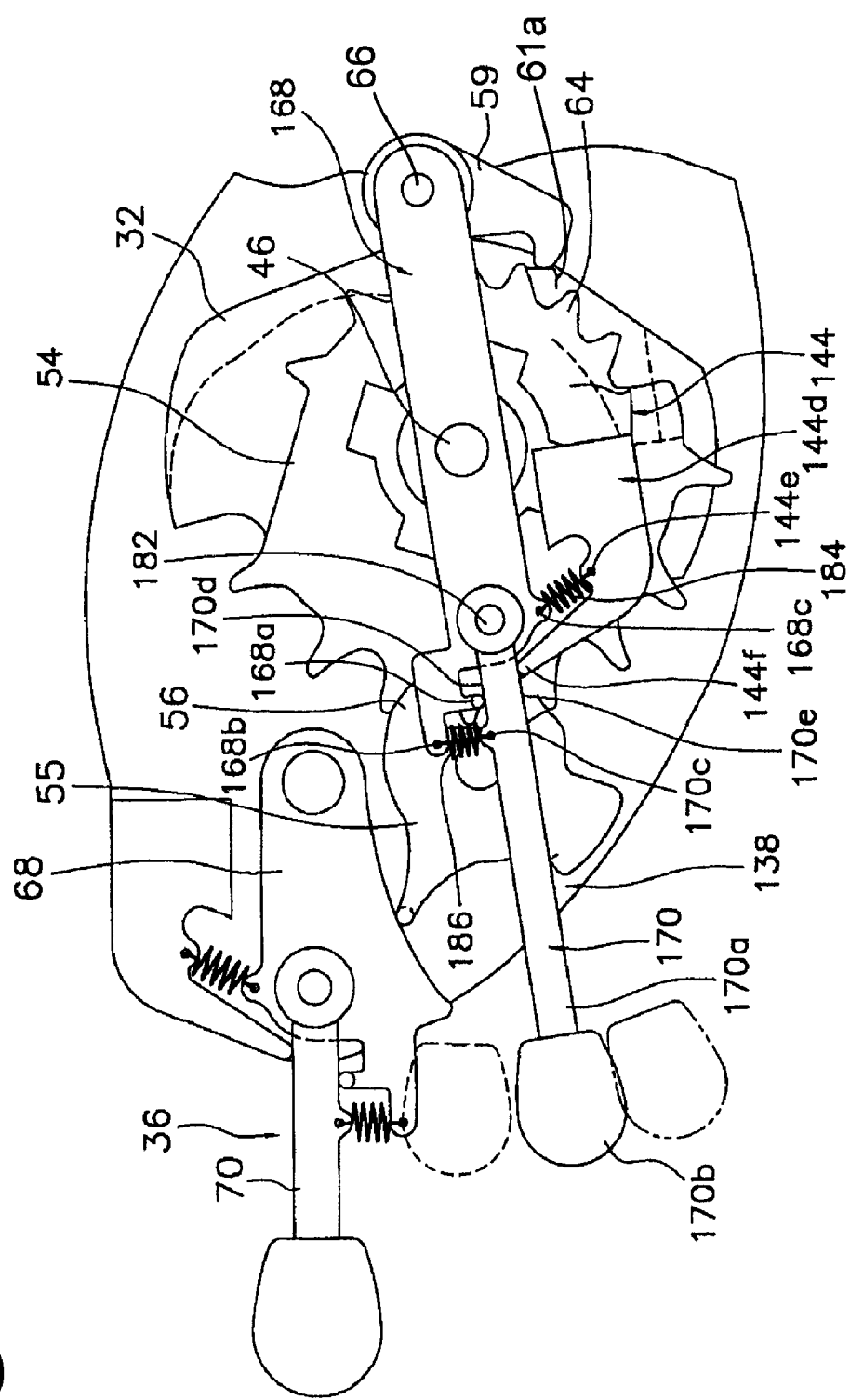
FIG. 8 is an internal plan view of another embodiment of a shift control device with first and second operating members in neutral positions.

In the first embodiment, only the cable releasing operation was performed by rotating an input member in either of both a first direction and a second direction. FIG. 8 is an internal plan view of another embodiment of a shift control device 16 wherein both cable winding and cable releasing operations may be performed by rotating respective input members in either of both a first direction and a second direction. In this embodiment, release lever 36 and pawl unit 55 is constructed the same as in the first embodiment, so a detailed description of their structure and operation shall be omitted. Other components that are similar to the first embodiment also are numbered the same.

As shown in FIG. 8, in this embodiment, cover 44 in the first embodiment is modified to form a cover 144 with a wall portion 144d formed at an outer side edge of cover 144 near a winding lever 138. Wall portion 144d includes a spring mounting portion 144e and a control portion 144f that functions in a manner discussed below. Winding lever 138 comprises an action member 168 and an input member 170. Action member 168 is rotatably mounted around support shaft 46, and input member 170 is rotatably mounted around a pivot shaft 182 that is vertically mounted at an intermediate portion of action member 168. Pivot shaft 182 is spaced apart from support shaft 46 and is oriented parallel to support shaft 46. Action member 168 includes a first control portion 168a in the form of a pin, a first spring mounting portion 168b, and a second spring mounting portion 168c. First control portion 168a is disposed between pivot shaft 182 and first spring mounting portion 168b. Drive pawl 59 is mounted to the end of action member 168 through pivot shaft 66 opposite first spring mounting portion 168b and is biased toward engagement with drive teeth 64 by a spring 67 as in the first embodiment.

Input member 170 comprises an arm member 170a and a knob portion 170b, wherein arm member 170a is rotatably mounted to pivot shaft 182, and knob portion 170b is fixed to the free end of arm member 170a. Arm member 170a includes a spring mounting portion 170c disposed opposite first spring mounting portion 168b on action member 168, a first control portion 170d in the form of an abutment disposed between pivot shaft 182 and spring mounting portion 170c opposite first control portion 168a on action member 168, and a second control portion 170e in the form of an abutment also disposed between pivot shaft 182 and spring mounting portion 170c, but disposed on the opposite side from first control portion 170d.

A first spring 184 has a first end mounted to first spring mounting portion 168c on action member 168 and a second end mounted to spring mounting portion 144e on wall portion 144d of cover 144 so that action member 168 is biased counterclockwise around support shaft 46. A second spring 186 has a first end mounted to first spring mounting portion 168b on action member 168 and a second end mounted to spring mounting portion 170c on arm member 170a so that arm member 170a is biased clockwise around pivot haft 182. As a result of these biasing forces, first control portion 170d of arm member 170a is biased to contact first control portion 168a of action member 168, second control portion 170e on arm member 170a is biased to contact control portion 144f of wall portion 144d of cover 144, and winding lever 138 is disposed in the neutral position.

To perform a cable winding operation, knob portion 170b of input member 170 of winding lever 138 is moved in either a first direction (e.g., clockwise) or a second direction (e.g., counterclockwise). When knob portion 170b of winding lever 138 is rotated in the first direction (clockwise in FIG. 8), first control portion 170d of input member 170 contacts first control portion 168a of action member 168 to press action member 168 clockwise so that arm member 170a and action member 168 rotate together around a common axis defined by support shaft 46. At the same time, the tip of drive pawl 59 moves away from abutting member 61a of pawl control plate 61, and drive pawl 59 is biased by spring 67 to engage one of the drive teeth 64. Continued movement of winding lever 138 causes winding member 32 and positioning member 54 to rotate in the cable pulling direction (clockwise in FIG. 8). During this time, positioning tooth 62c presses against positioning pawl 56 in the same manner as in the first embodiment so that pawl unit 55 rotates counterclockwise to the disengaged position. After positioning tooth 62c passes under positioning pawl 56, pawl unit 55 rotates clockwise so that positioning pawl 56 moves back to the engaged position.

When the rider releases winding lever 138, first spring 84 pulls arm member 170a counterclockwise until second control portion 170e of arm member 170a contacts control portion 144f of wall portion 144d of cover 144, second spring 186 pulls action member 168 counterclockwise so that first control portion 168a of action member 168 continues to contact first control portion 170d of arm member 170a, the tip of drive pawl 59 returns to its position on abutting member 61a of pawl control plate 61 (out of engagement with drive teeth 64), and winding lever 138 is disposed in the neutral position. At the same time, winding member 32 and positioning member 54 rotate counterclockwise until positioning pawl 56 engages positioning tooth 62c, and winding member 32 is set at the destination operating position. On the other hand, if the rider continues moving release lever 138, then the process repeats so that winding member 32 moves through a plurality of destination positions.

When knob portion 170b of input member 170 of winding lever 138 is moved in the second direction (counterclockwise in FIG. 8), second control portion 170e of arm member 170a contacts control portion 144f of wall portion 144d of cover 144 so that arm member 170a pivots counterclockwise around control portion 144f with control portion 144f acting as a fulcrum defining a rotational axis, and the end of arm member 170a connected to pivot shaft 182 rotates around pivot shaft 182 (which defines another rotational axis) while causing action member 168 to rotate clockwise around pivot shaft 180. As in the previous operation, the tip of drive pawl 59 moves away from abutting member 61a of pawl control plate 61, drive pawl 59 is biased by spring 67 to engage one of the drive teeth 64, and the operation proceeds as described above.

When the rider releases winding lever 138, first spring 184 pulls action member 168 counterclockwise which, in turn, causes pivot shaft 182 to pull arm member 170a clockwise until first control portion 168a on action member 168 contacts first control portion 170d on arm member 170a, the tip of drive pawl 59 returns to its position on abutting member 61a of pawl control plate 61 (out of engagement with drive teeth 64), and the operation proceeds as described above.

Figure 9:
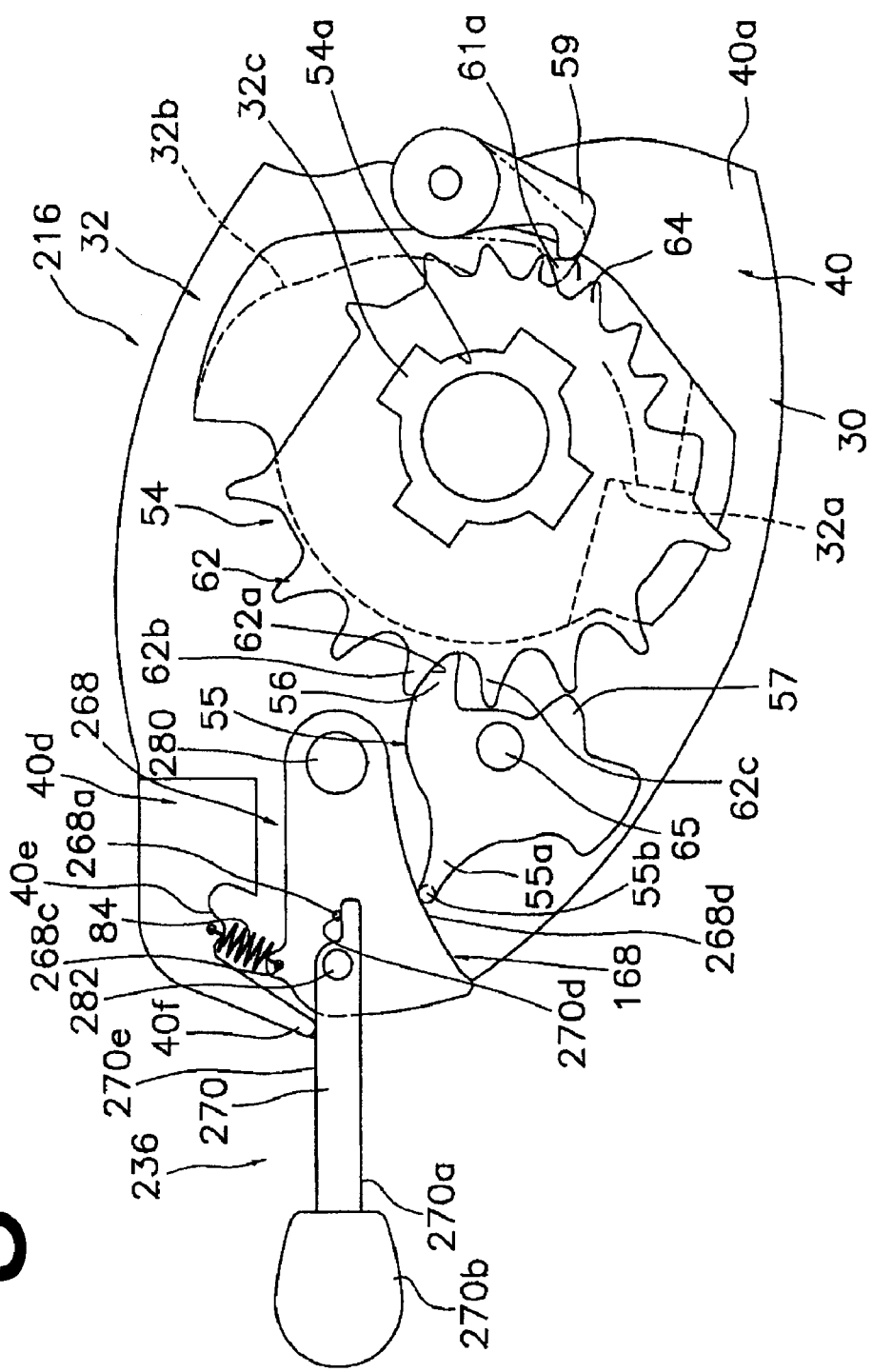
FIG. 9 is an internal plan view of another embodiment of a shift control device with an operating member in a neutral position.

FIG. 9 is an internal plan view of another embodiment of a shift control device which illustrates how the biasing of the various components may be accomplished in many ways, and how the various control portions may be configured in many different ways. In this embodiment, the components that are similar in structure and operation as in the first embodiment are numbered the same and will not be described in detail.

As shown in FIG. 9, a release lever 236 comprises an action member 268 and an input member 270. Action member 268 is rotatably mounted around a pivot shaft 280 that is vertically mounted relative to bracket 40, and input member 270 is rotatably mounted around a pivot shaft 282 that is vertically mounted at a left side portion of action member 268. As in the first embodiment, pivot shaft 282 is spaced apart from pivot shaft 280 and is oriented parallel to pivot shaft 280. Action member 268 includes a first control portion 268a in the form of a pin, a spring mounting portion 268c, and a second control portion 268d in the form of an inclined and curved side surface. First control portion 268a is disposed between pivot shaft 280 and pivot shaft 282 in close proximity to pivot shaft 282, and second control portion 268d extends from below pivot shaft 280 arcuately downward to the left to a location below pivot shaft 282.

Input member 270 comprises an arm member 270a and a knob portion 270b, wherein arm member 270a is rotatably mounted to pivot shaft 282, and knob portion 270b is fixed to the free end of arm member 270a. Arm member 270a includes a first control portion 270d in the form of an abutment disposed between pivot shaft 280 and pivot shaft 282 opposite first control portion 268a on action member 268, and a second control portion 270e in the form of an abutment disposed between pivot shaft 282 and knob portion 270b and disposed on the same side as first control portion 270d.

A spring 84 has a first end mounted to spring mounting portion 268c of action member 268 and a second end mounted to spring mounting portion 40e of wall portion 40d of mounting bracket 40. As a result of the biasing force of spring 84, action member 268 is biased clockwise around pivot shaft 280 so that pivot shaft 282 pulls input member 270 clockwise around pivot shaft 280 until second control portion 270e on arm member 270a contacts control portion 40f of wall portion 40d and first control portion 268a of action member 268 contacts first control portion 270d of arm member 270, thereby setting input member 270 into a neutral position.

Figure 10:
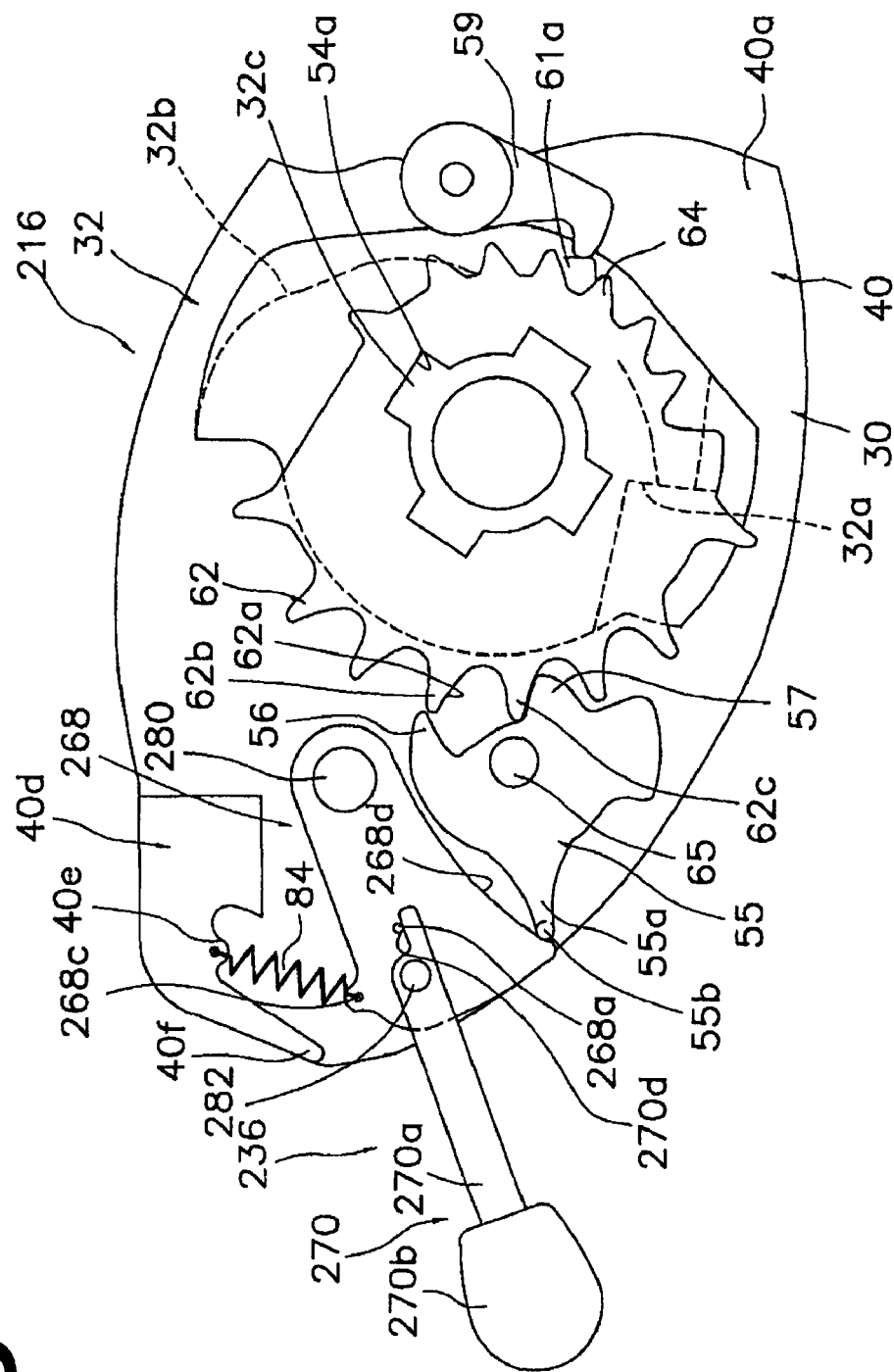
FIG. 10 is an internal plan view of the shift control device when the operating member is moved in a first direction.
Figure 12:
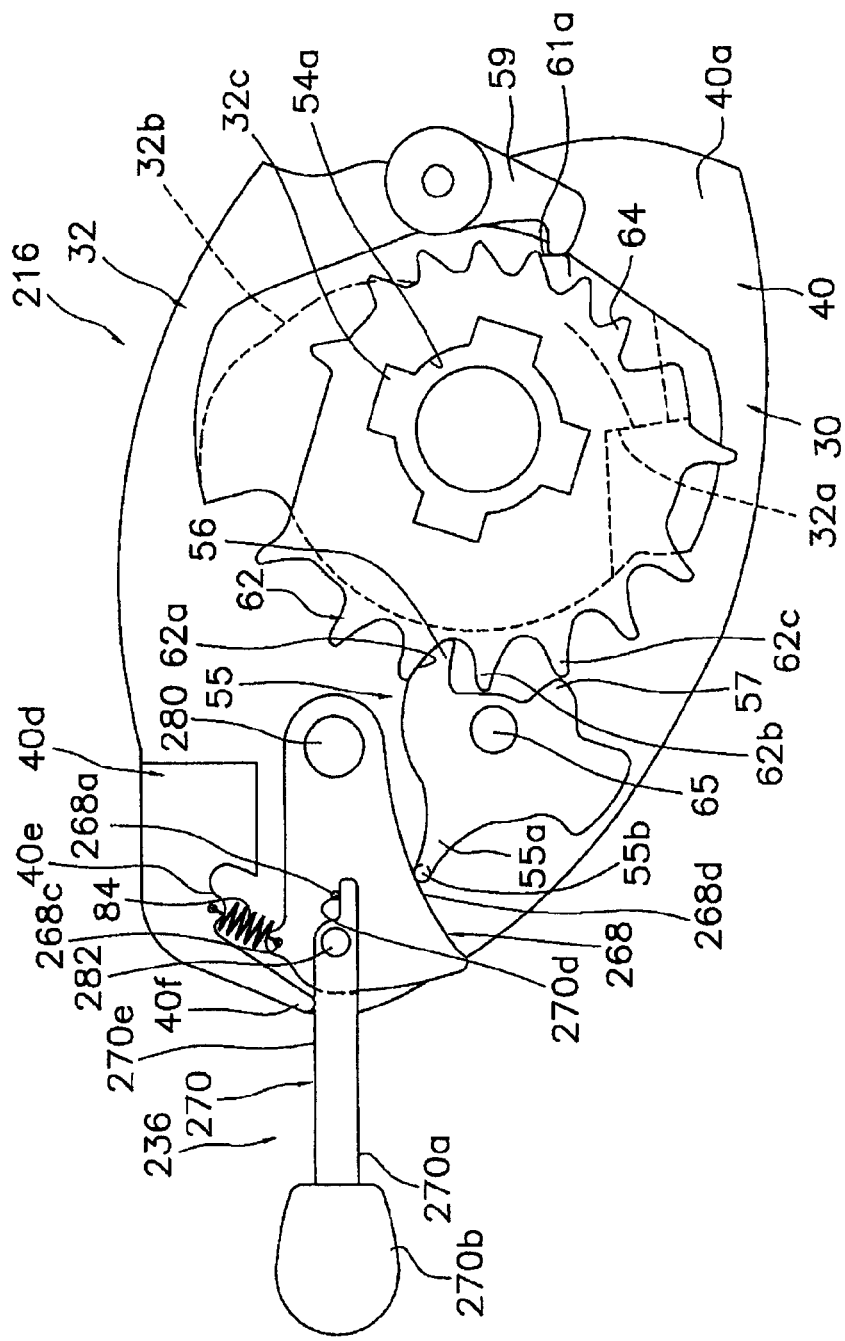
FIG. 12 is an internal plan view of the shift control device after completion of a cable releasing operation.

To perform a cable release operation, knob portion 270b of input member 270 of release lever 236 is moved in either a first direction or a second direction. When knob portion 270b of input member 270 of release lever 236 is moved in the first direction (e.g., counterclockwise in FIGS. 9 and 10), first control portion 270d of input member 270 contacts first control portion 268a of action member 268 so that arm member 270a and action member 268 rotate together around a common axis defined by pivot shaft 280. At the same time, second control portion 268d of action member 268 presses against control member 55b on pawl unit 55, pawl unit 55 rotates counterclockwise to move positioning pawl 56 from the engaged position shown in FIG. 9 to the disengaged position shown in FIG. 10, and the operation proceeds as in the first embodiment. When knob portion 270b is released, spring 84 pulls action member 268 and input member 270 back to the neutral position, and the bicycle transmission completes a shift by one gear ratio as shown in FIG. 12.

Figure 11:
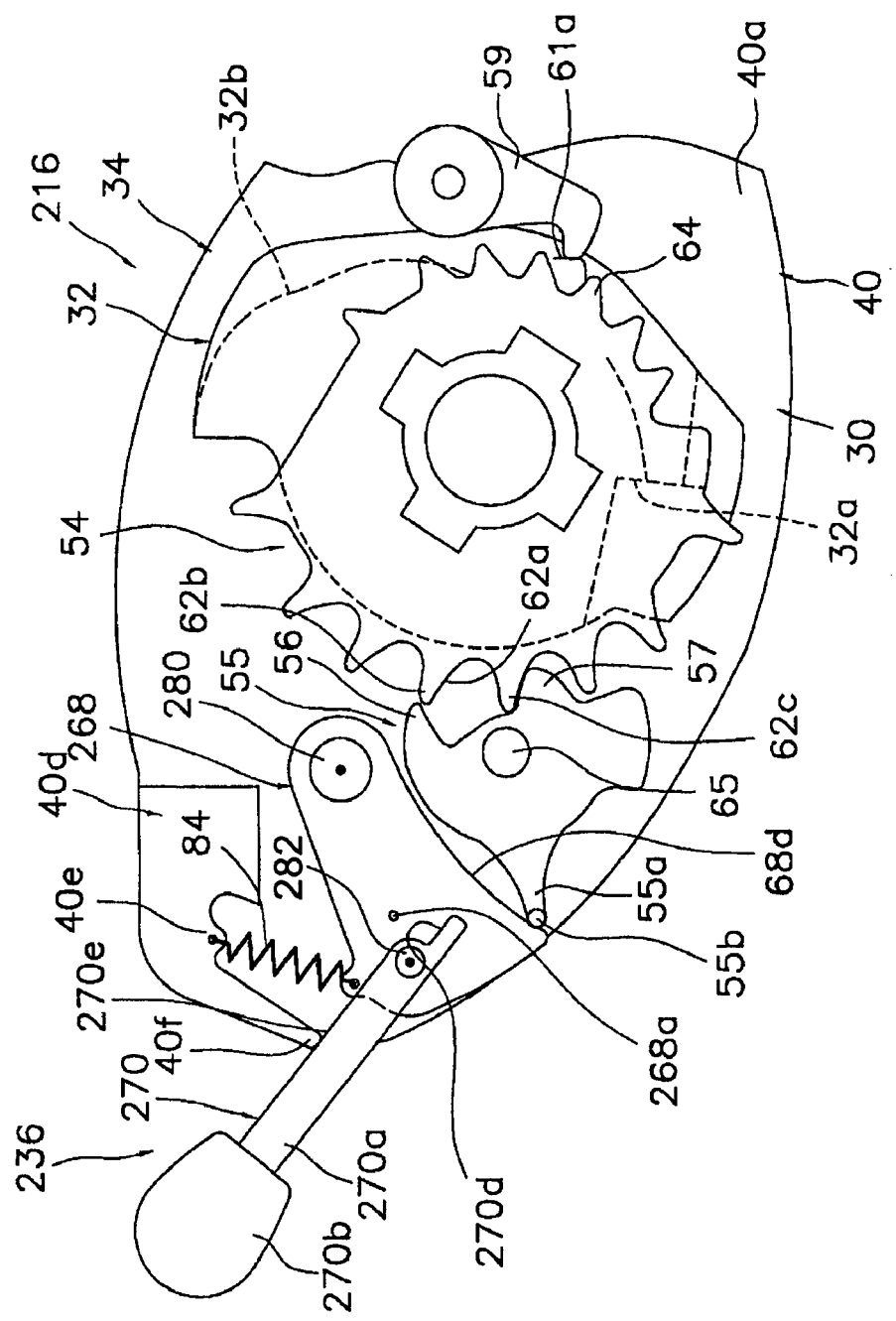
FIG. 11 is an internal plan view of the shift control device when the operating member is moved in a second direction.

When knob portion 270b of input member 270 of release lever 236 is moved in the second direction (e.g., clockwise in FIGS. 9 and 11), second control portion 270e of input member 270 contacts control portion 40f of wall portion 40d of mounting bracket 40 so that arm member 270a pivots clockwise around control portion 40f with control portion 40f acting as a fulcrum defining a rotational axis, and the end of arm member 270a connected to pivot shaft 282 rotates around pivot shaft 282 (which defines another rotational axis) while causing action member 268 to rotate counterclockwise around pivot shaft 280. As in the previous operation, second control portion 268d of action member 268 presses against control member 55b on pawl unit 55, and pawl unit 55 rotates counterclockwise to move positioning pawl 56 from the engaged position shown in FIG. 9 to the disengaged position shown in FIG. 11, and the operation proceeds as in the first embodiment. When knob portion 270b is released, spring 84 pulls action member 268 and input member 270 back to the neutral position, and the bicycle transmission again completes a shift by one gear ratio as shown in FIG. 12.

Figure 13:
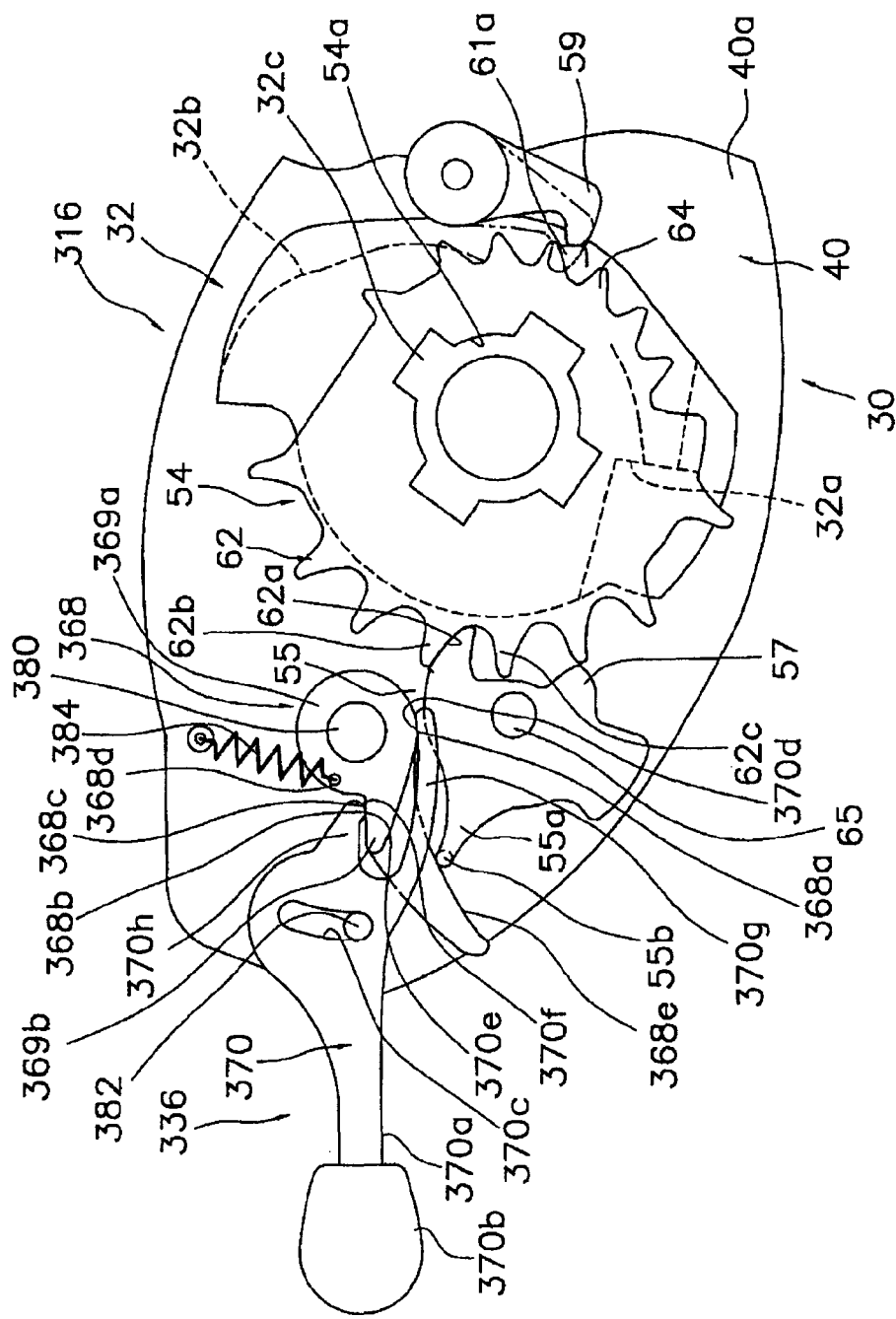
FIG. 13 is an internal plan view of another embodiment of a shift control device with an operating member in a neutral position.

FIG. 13 is an internal plan view of another embodiment of a shift control device which illustrates how the input member need not be mounted to the action member. In this embodiment, the components that are similar in structure and operation as in the first embodiment are numbered the same and will not be described in detail.

As shown in FIG. 13, a release lever 336 comprises an action member 368 and an input member 370. Action member 368 is rotatably mounted around a pivot shaft 380 that is vertically mounted relative to bracket 40, and input member 370 is rotatably mounted around a pivot shaft 382 that is vertically and fixedly mounted relative to bracket 40. As in the first embodiment, pivot shaft 382 is spaced apart from pivot shaft 380 and is oriented parallel to pivot shaft 380. Pivot shaft 382 is an example of an abutment coupled to mounting member 30. Action member 368 comprises a generally annular main body 369a and a projecting member 369b formed as one piece with main body 369a and extending toward input member 370. Action member 368 further includes a first control portion 368a in the form of an abutment formed on main body 369a orthogonal from a straight line connecting pivot shafts 380 and 382, second and third control portions 368b and 368c formed on an upper surface of projecting member 369b, a spring mounting portion 368d disposed on main body 369a above projecting member 369b, and a fourth control portion 368e in the form of an inclined and curved side surface on a lower side of projecting member 369b. First control portion 368a is disposed between pivot shaft 380 and pivot shat 65. Second and third control portions 368b and 368c are disposed between pivot shafts 380 and 382, and fourth control portion 368e extends from below pivot shaft 380 arcuately downward to the left to a location below pivot shaft 382.

Input member 370 comprises an arm member 370a and a knob portion 370b, wherein arm member 370a includes a widened portion that accommodates an arcuate groove in the form of a slot 370c centered relative to pivot shaft 380 and in which pivot shaft 382 is rotatably and slidably disposed. A first projecting member 370g arcuately extends from a lower side portion of arm member 370a to a location below pivot shaft 380 and includes a first control portion 370d in the form of an abutment that faces first control portion 368a of action member 368. A second projecting member 370h extends from an intermediate side portion of arm member 370a to a location to the left of pivot shaft 380 and includes a second control portion 370e and a third control portion 370f. Second control portion 370e has the form of an abutment that faces second control portion 368b on action member 368, and third control portion 370f has the form of an arcuate abutment forming the free end of second projecting member 370h.

A spring 384 has a first end mounted to spring mounting portion 368d on action member 368, and a second end mounted to mounting bracket 40. As a result of the biasing force of spring 384, action member 368 is biased clockwise around pivot shaft 380 so that second control portion 368b on projecting member 369b of action member 368 presses against second control portion 370e on second projecting member 370f of arm member 370a to rotate arm member 370a clockwise around pivot shaft 380 until pivot shaft 382 contacts the lower edge of slot 370c. Contact between first control portion 368a of action member 368 and first control portion 370d on first projecting member 370g of arm member 370a prevents arm member 370a from rotating counterclockwise around pivot shaft 382 at this time, thereby setting input member 370 into a neutral position.

Figure 14:
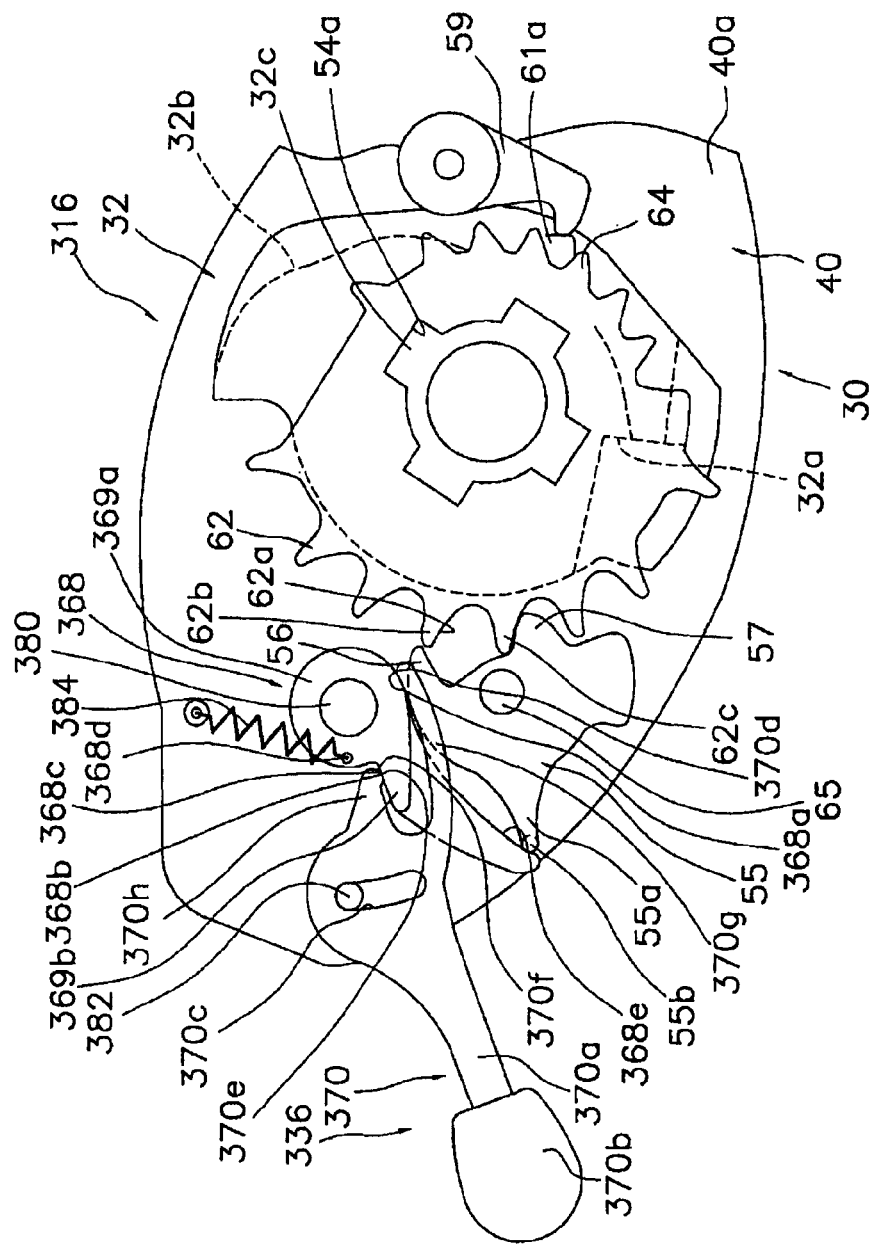
FIG. 14 is an internal plan view of the shift control device when the operating member is moved in a first direction.
Figure 16:
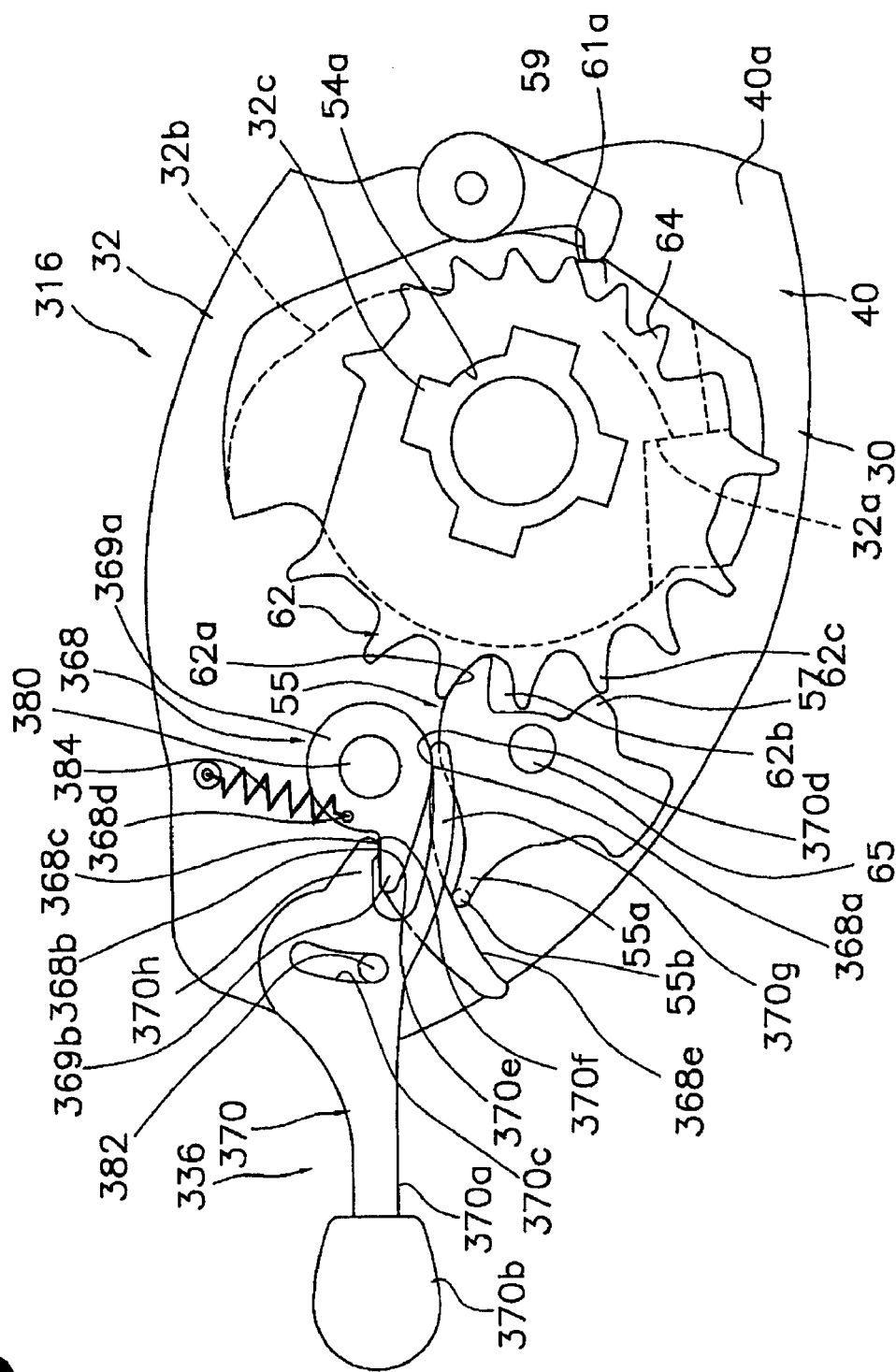
FIG. 16 is an internal plan view of the shift control device after completion of a cable releasing operation.

To perform a cable release operation, knob portion 370b of input member 370 of release lever 336 is moved in either a first direction or a second direction. When knob portion 370b of input member 370 of release lever 336 is moved in the first direction (e.g., counterclockwise in FIGS. 13 and 14), second control portion 370e of arm member 370a presses against second control portion 368b of action member 368 while first control portion 370d of arm member 370a contacts first control portion 368a of action member 368 so that arm member 370a and action member 368 rotate together around a common axis defined by pivot shaft 380, and second pivot shaft 382 moves to the upper end of slot 370c as shown in FIG. 14. At the same time, fourth control portion 368e of action member 368 presses against control member 55b on pawl unit 55, pawl unit 55 rotates counterclockwise to move positioning pawl 56 from the engaged position shown in FIG. 13 to the disengaged position shown in FIG. 14, and the operation proceeds as in the first embodiment. When knob portion 370b is released, the biasing force of spring 384 causes second control portion 368b of action member 368 to press against second control portion 370b of arm member 370a to move input member 370 clockwise back to the neutral position, and the bicycle transmission completes a shift by one gear ratio as shown in FIG. 16.

Figure 15:
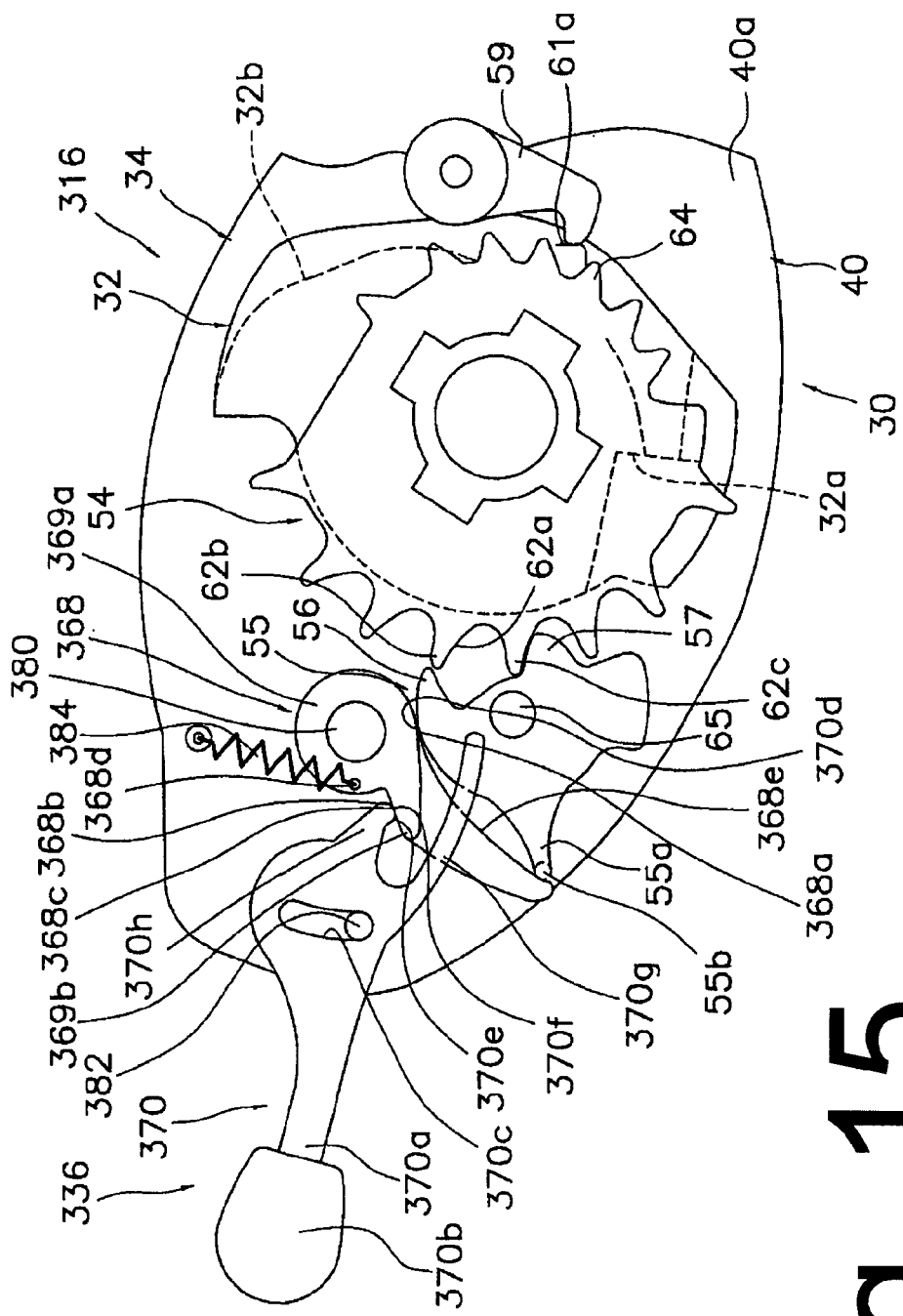
FIG. 15 is an internal plan view of the shift control device when the operating member is moved in a second direction.

When knob portion 370b of release lever 336 is moved in the second direction (e.g., clockwise in FIGS. 13 and 15), the abutment formed at the lower end of slot 370c in arm member 370a engages the abutment formed by the surface of pivot shaft 382 so that arm member 370a pivots clockwise around pivot shaft 382, and second control portion 370e of arm member 370a initially contacts second control portion 368b of action member as above. As arm member 370a continues to pivot clockwise around pivot shaft 382, third control portion 370f of arm member 370a presses against third control portion 368c of action member 368 to cause action member 368 to rotate counterclockwise around pivot shaft 380, and first control portion 370a of arm member 370 separates from first control portion 368a of action member 368 as shown in FIG. 15. The lengths of third control portion 370f of arm member 370a and third control portion 368c of action member are made sufficient to accommodate such movement. As in the previous operation, fourth control portion 368*e* of action member 368 presses against control member 55*b* on pawl unit 55, and pawl unit 55 rotates counterclockwise to move positioning pawl 56 from the engaged position shown in FIG. 13 to the disengaged position shown in FIG. 15, and the operation proceeds as in the first embodiment. When knob portion 370*b* is released, the biasing force of spring 384 causes third control portion 368*c* of action member 368 to press against third control portion 370*f* of arm member 370*a* to rotate arm member 370*a* counterclockwise around pivot shaft 382 back to the neutral position, and the bicycle transmission completes a shift by one gear ratio as shown in FIG. 16.

While the above is a description of various embodiments of inventive features, further modifications may be employed without departing from the spirit and scope of the present invention. For example, while the disclosed embodiments were used to shift derailleur transmissions, the concepts also could be applied to other control devices, such as internal hub transmissions. While the mounting members of the shift control devices were separated from the brake levers, the mounting members could be formed integrally with the brake lever assemblies. While the disclosed embodiments included a positioning unit that operated to shift gears in the cable releasing direction by one step at a time, the positioning unit easily can be modified to shift multiple gears for each operation of the releaser lever.

The size, shape, location or orientation of the various components may be changed as desired. Components that are shown directly connected or contacting each other may have intermediate structures disposed between them. Separate components may be combined, and vice versa. The functions of one element may be performed by two, and vice versa. The function of one element may be performed by another, and functions may be interchanged among the elements. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A shift operating device for a bicycle comprising:
   a mounting member structured to be mounted to the bicycle;
   a cable coupling member coupled to the mounting member for moving a cable in a cable pulling direction and a cable releasing direction;
   a positioning unit that selectively maintains the cable coupling member in a plurality of operating positions;
   an input member that moves in a first direction and in a second direction different from the first direction;
   an action member rotatably coupled to the mounting member and separate from the input member, wherein the action member rotates to transmit movement of the input member to the positioning unit such that the cable coupling member moves from an origin operating position toward a destination operating position in a prescribed direction to initiate a gear shift when the input member moves in the first direction, and wherein the action member rotates to transmit movement of the input member to the positioning unit such that the cable coupling member moves from an origin operating position toward a destination operating position in the same direction as the prescribed direction to initiate a gear shift when the input member moves in the second direction; and
   wherein the input member and the action member pivot around different axes.

2. The device according to claim 1 wherein the cable coupling member moves in the cable pulling direction in response to movement of the input member in either of both the first direction and the second direction.

3. The device according to claim 1 wherein the cable coupling member moves in the cable releasing direction in response to movement of the input member in either of both the first direction and the second direction.

4. The device according to claim 1 wherein the input member rotates around a first axis, wherein the action member rotates around a second axis, and wherein the first axis is different from the second axis.

5. The device according to claim 1 wherein the input member and the action member rotate around a common axis.

6. The device according to claim 1 wherein the input member rotates around a first axis, wherein the action member rotates around a second axis, wherein the first axis is different from the second axis, and wherein the input member and the action member rotate around a common axis.

7. The device according to claim 1 wherein the input member moves integrally with the action member.

8. The device according to claim 1 wherein the input member is movably mounted to the action member.

9. The device according to claim 8 wherein the input member and the action member rotate around a common axis.

10. The device according to claim 9 wherein the input member includes a first abutment that drives a first abutment disposed on the action member so that the input member and the action member rotate around the common axis when the input member moves in at least one of the first direction or the second direction.

11. The device according to claim 8 wherein the input member rotates around a first axis, wherein the action member rotates around a second axis, and wherein the first axis is different from the second axis.

12. The device according to claim 11 wherein the input member includes a first abutment that drives a first abutment coupled to the mounting member when the input member moves in at least one of the first direction or the second direction so that the input member rotates around the first axis and the action member rotates around the second axis.

13. The device according to claim 12 wherein the first abutment coupled to the mounting member is fixed relative to the mounting member.

14. The device according to claim 12 wherein the first abutment of the input member drives the first abutment coupled to the mounting member when the input member moves in one of the first direction or the second direction so that the input member rotates around the first axis and the action member rotates around the second axis, and wherein the input member includes a second abutment that drives a second abutment disposed on the action member so that the input member and the action member rotate around a common axis when the input member moves in the other one of the first direction or the second direction.

15. The device according to claim 14 wherein the input member has a neutral position and moves in the first direction and the second direction from the neutral position.

16. The device according to claim 15 wherein, when the input member is in the neutral position, the first abutment of the input member contacts the first abutment coupled to the mounting member, and the second abutment of the input member contacts the second abutment of the action member.

17. The device according to claim 15 further comprising a biasing unit that biases the input member toward the neutral position.

18. The device according to claim 17 wherein the biasing unit comprises a spring having a first end coupled to the action member and a second end coupled to a member fixed relative to the mounting member.

19. The device according to claim 17 wherein the biasing unit comprises a spring having a first end coupled to the action member and a second end coupled to the input member.

20. The device according to claim 17 wherein the biasing unit comprises:
 a first spring having a first end coupled to the action member and a second end coupled to a member fixed relative to the mounting member; and
 a second spring having a first end coupled to the action member and a second end coupled to the input member.

21. The device according to claim 1 wherein the input member is movably mounted to the mounting member.

22. The device according to claim 21 wherein the input member and the action member rotate around a common axis.

23. The device according to claim 22 wherein the input member includes a first abutment that drives a first abutment disposed on the action member so that the input member and the action member rotate around the common axis when the input member moves in at least one of the first direction or the second direction.

24. The device according to claim 23 wherein the input member is mounted to the mounting member through a shaft that moves linearly within a groove disposed on the input member when the input member moves in the at least one of the first direction or the second direction.

25. The device according to claim 21 wherein the input member rotates around a first axis, wherein the action member rotates around a second axis, and wherein the first axis is different from the second axis.

26. The device according to claim 25 wherein the input member includes a first abutment that operatively engages a first abutment coupled to the mounting member when the input member moves in at least one of the first direction or the second direction so that the input member rotates around the first axis and the action member rotates around the second axis.

27. The device according to claim 26 wherein the first abutment coupled to the mounting member is fixed relative to the mounting member.

28. The device according to claim 27 wherein the first abutment coupled to the mounting member is disposed to move linearly within a groove disposed on the input member.

29. The device according to claim 26 wherein the first abutment of the input member contacts the first abutment coupled to the mounting member when the input member moves in one of the first direction or the second direction so that the input member rotates around the first axis and the action member rotates around the second axis, and wherein the input member includes a second abutment that drives a second abutment disposed on the action member so that the input member and the action member rotate around a common axis when the input member moves in the other one of the first direction or the second direction.

30. The device according to claim 29 wherein the input member has a neutral position and moves in the first direction and the second direction from the neutral position.

31. The device according to claim 30 wherein, when the input member is in the neutral position, the first abutment of the input member contacts the first abutment coupled to the mounting member, and the second abutment of the input member contacts the second abutment of the action member.

32. The device according to claim 30 further comprising a biasing unit that biases the input member toward the neutral position.

33. The device according to claim 32 wherein the biasing unit comprises a spring having a first end coupled to the action member and a second end coupled to a member fixed relative to the mounting member.

34. The device according to claim 1 wherein the action member rotates around an axis.

35. The device according to claim 34 wherein the axis extends along a pivot shaft.

* * * * *